United States Patent
Takagi et al.

(10) Patent No.: US 9,864,128 B2
(45) Date of Patent: Jan. 9, 2018

(54) LIGHT GUIDE BODY, LIGHT EMITTING APPARATUS, AND AMUSEMENT MACHINE

(71) Applicant: OMRON Corporation, Kyoto-shi, Kyoto (JP)

(72) Inventors: Yoshihiko Takagi, Kyoto (JP); Masayuki Shinohara, Kyoto (JP); Yoshimasa Osumi, Kyoto (JP); Norikazu Kitamura, Osaka (JP)

(73) Assignee: OMRON Corporation, Kyoto (JP)

( * ) Notice: Subject to any disclaimer, the term of this patent is extended or adjusted under 35 U.S.C. 154(b) by 145 days.

(21) Appl. No.: 14/528,240

(22) Filed: Oct. 30, 2014

(65) Prior Publication Data
US 2015/0131316 A1  May 14, 2015

(30) Foreign Application Priority Data

Nov. 11, 2013  (JP) .................................. 2013-233527

(51) Int. Cl.
*F21V 8/00* (2006.01)

(52) U.S. Cl.
CPC ........... *G02B 6/0068* (2013.01); *G02B 6/006* (2013.01); *G02B 6/0036* (2013.01)

(58) Field of Classification Search
CPC ..... G02B 6/0068; G02B 6/0036; G02B 6/006
See application file for complete search history.

(56) References Cited

U.S. PATENT DOCUMENTS

| 6,447,136 B1* | 9/2002 | Liu ...................... | G02B 6/0036 362/146 |
| 7,108,414 B2* | 9/2006 | McCollum ................ | F21V 5/00 362/603 |
| 8,651,724 B2* | 2/2014 | Richardson .......... | G02B 6/0036 359/222.1 |
| 8,934,071 B2* | 1/2015 | Momose .............. | G02B 6/0036 349/62 |
| 2003/0123245 A1* | 7/2003 | Parker ................... | A61M 21/02 362/602 |

(Continued)

FOREIGN PATENT DOCUMENTS

JP  H11-85075 A  3/1999
JP  2003-045214 A  2/2003

(Continued)

OTHER PUBLICATIONS

Notification of Reasons for Refusal issued in corresponding Japanese Application No. 2013-233527, dated Aug. 1, 2017 (5 pages).

*Primary Examiner* — Anabel Ton
(74) *Attorney, Agent, or Firm* — Osha Liang LLP

(57) ABSTRACT

A light guide body configured to guide light from a light source that enters the light guide body has a light exit surface having at least one light emitting region from which light from the light source is emitted, and a plurality of reflection patterns arranged in a reflection region of a counter surface facing the light exit surface. The reflection region is a region corresponding to the at least one light emitting region. The reflection region has at least a first reflection region that reflects light in a first direction, and a second reflection region that reflects light in a second direction differing from the first direction.

12 Claims, 10 Drawing Sheets

(56) References Cited

U.S. PATENT DOCUMENTS

| | | | |
|---|---|---|---|
| 2009/0097274 A1* | 4/2009 | Shinohara | G02B 5/0215 362/619 |
| 2009/0109650 A1 | 4/2009 | Winkler | |
| 2009/0109651 A1 | 4/2009 | Winkler | |
| 2009/0109801 A1 | 4/2009 | Winkler | |
| 2010/0039832 A1 | 2/2010 | Ahlgren et al. | |
| 2012/0015157 A1* | 1/2012 | Chen | B32B 3/30 428/195.1 |
| 2012/0032997 A1* | 2/2012 | Cha | H04N 13/0418 345/690 |
| 2013/0182451 A1* | 7/2013 | Oba | B60Q 1/00 362/503 |
| 2013/0258716 A1* | 10/2013 | Fang | G09F 13/04 362/613 |
| 2014/0104881 A1* | 4/2014 | Yang | G02B 6/0038 362/611 |
| 2015/0003112 A1* | 1/2015 | McCollum | F21V 5/00 362/613 |
| 2015/0168627 A1* | 6/2015 | Takagi | G02B 6/006 362/613 |
| 2015/0185396 A1* | 7/2015 | Takagi | G02B 6/0068 362/613 |

FOREIGN PATENT DOCUMENTS

| | | |
|---|---|---|
| JP | 2006-075362 A | 3/2006 |
| JP | 2008-522173 A | 6/2008 |

\* cited by examiner

LIGHT GUIDE BODY, LIGHT EMITTING APPARATUS, AND AMUSEMENT MACHINE

This Nonprovisional application claims priority under 35 U.S.C. §119 on Patent Application No. 2013-233527 filed in Japan on Nov. 11, 2013, the entire contents of which are hereby incorporated by reference.

BACKGROUND

Technical Field

The present invention relates to a light guide body in which light emitted from a light source and having entered the light guide body is guided and emitted through a light exit surface, a light emitting apparatus including the light guide body, and an amusement machine.

Related Art

Conventionally, there is known a technique in which light emitted from a light source enters a light guide plate through a side surface of the light guide plate and the light is reflected by a reflection pattern, provided on a back surface of the light guide plate, so as to exit through a front surface of the light guide plate.

For example, Patent Literature 1 discloses a technique in which a reflection pattern is provided in a region, having a shape corresponding to a predetermined text, of a back surface of a light guide plate, so that a region of a front surface of the light guide plate which region corresponds to the text emits light.

Patent Literature 1
Japanese Patent Application Publication, Tokukaihei, No. 11-85075 A (Publication Date: Mar. 30, 1999)

SUMMARY

However, although the technique disclosed in Patent Literature 1 makes it possible to display the text corresponding to the shape of the reflection pattern, the technique merely allows carrying out planar text display because the emitted light is substantially uniform throughout the area of the text.

One or more embodiments of the present invention allows an observer to stereoscopically visually recognize a light emitting region set in a light exit surface of a light guide body which guides light emitted from a light source and causes the light to exit through the light emitting region.

A light guide body according to one or more embodiments of the present invention is a light guide body which guides light having entered the light guide body from a light source and causes the light to exit through at least one light emitting region set in a light exit surface of the light guide body, the light guide body including: a plurality of reflection patterns arranged in a reflection region of a counter surface facing the light exit surface, the reflection region being a region corresponding to the at least one light emitting region, the reflection region at least including a first reflection region in which the light is reflected in a first direction and a second reflection region in which the light is reflected in a second direction differing from the first direction.

According to the configuration, the light reflected in the first direction exits through the light exit surface in the first direction, and the light reflected in the second reflection region exits through the at least one light emitting region in the second direction.

Therefore, in a case where an observer observes the light exit surface from the first direction, a part of the at least one light emitting region which part corresponds to the first reflection region is visually recognized as a bright part, and a part of the at least one light emitting region which part corresponds to the second reflection region is visually recognized as a dark part. Meanwhile, in a case where the observer observes the light exit surface from the second direction, the part of the at least one light emitting region which part corresponds to the first reflection region is visually recognized as a dark part, and the part of the at least one light emitting region which part corresponds to the second reflection region is visually recognized as a bright part.

As described earlier, according to the configuration, a direction in which light exits through the at least one light emitting region partially (intermittently) changes. Therefore, an amount of light which reaches the observer changes in accordance with an observation position. This allows the observer to visually recognize that the at least one light emitting region partially has a bright part and a dark part.

Therefore, the configuration may make it possible to provide the light guide body which, by forming a bright part and a dark part in the at least one light emitting region and combining the bright part and the dark part, allows the observer to stereoscopically visually recognize the at least one light emitting region.

According to the configuration, the bright part and the dark part of the at least one light emitting region change in position in accordance with the observation position of the observer. This may make it possible to obtain a suitable visual effect in stereoscopic view.

One or more embodiments of the present invention provides a light guide body which allows an observer to stereoscopically visually recognize a light emitting region, a light emitting apparatus, and an amusement machine.

BRIEF DESCRIPTION OF DRAWINGS

FIG. 1(a) is a top view of the light emitting apparatus, and FIG. 1(b) is a perspective view of the light emitting apparatus.

FIG. 9(a) is a top view of the light emitting apparatus, and FIG. 9(b) is a perspective view of the light emitting apparatus.

DETAILED DESCRIPTION

Figure 1:
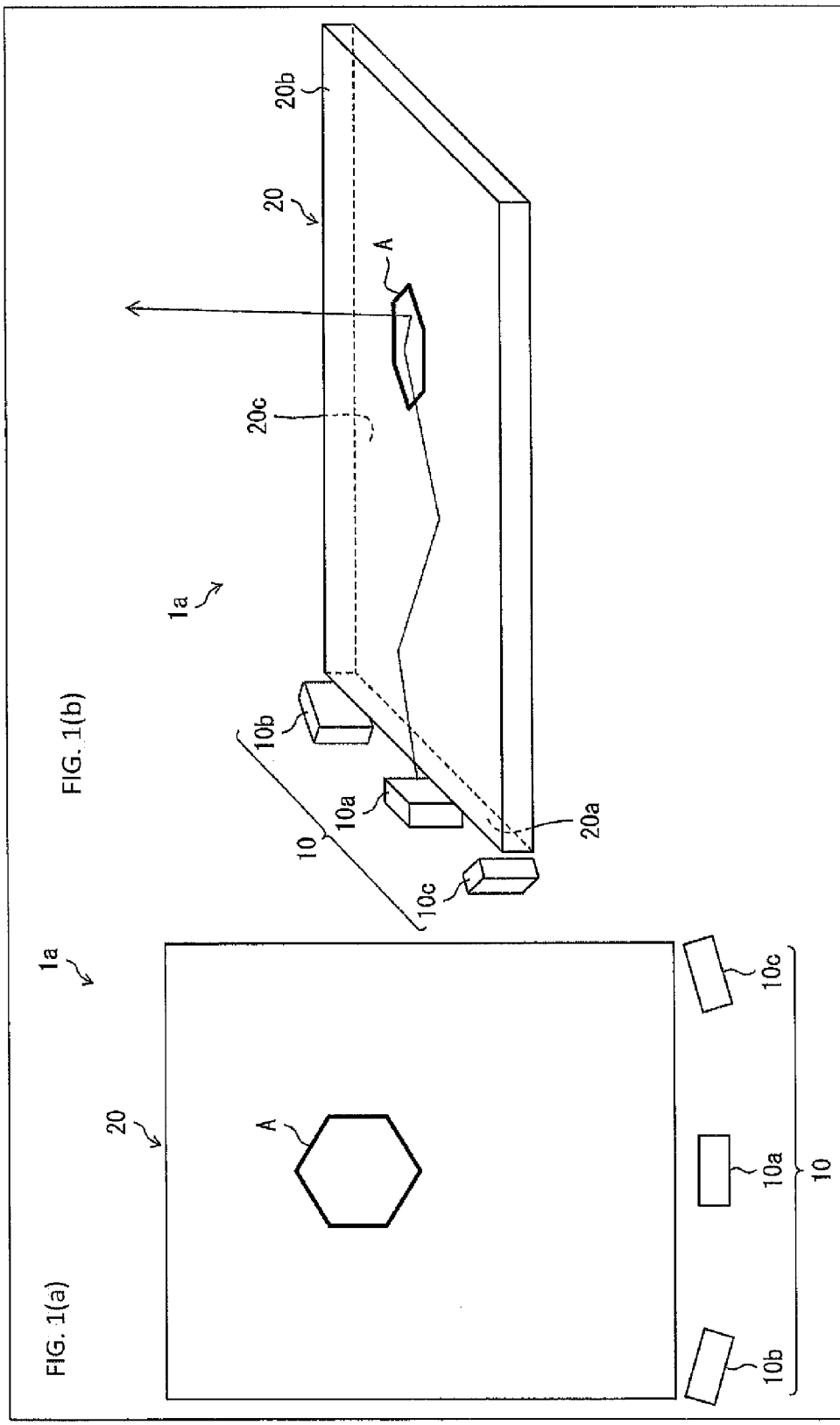
FIGS. 1(a)-1(b) are explanatory drawings schematically illustrating a configuration of a light emitting apparatus including a light guide plate of Embodiment 1.

Embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Embodiment 1

Embodiments of the present invention are described below with reference to FIG. 1(a) through 8. Embodiment 1 discusses an example of a light emitting apparatus including a light guide body.

<Configuration of Light Emitting Apparatus 1a>

FIGS. 1(a)-1(b) are explanatory drawings schematically illustrating a configuration of a light emitting apparatus 1a including a light guide plate 20 of Embodiment 1. FIG. 1(a) is a top view of the light emitting apparatus 1a, and FIG. 1(b) is a perspective view of the light emitting apparatus 1a. The light emitting apparatus 1a stereoscopically displays an object such as a diagram, a text, or a picture pattern on a front surface 20b of the light guide plate 20.

The light emitting apparatus 1a includes a light source 10 and the light guide plate (light guide body) 20 (FIG. 1(a)-1(b)).

(Light Source 10)

The light source 10 is a light emitting device which emits light toward a side surface (light entrance surface) 20a of the light guide plate 20. The light source 10 is provided so as to face the side surface 20a of the light guide plate 20. Light emitted from the light source 10 enters the light guide plate 20 through the side surface 20a.

According to Embodiment 1, three light sources 10a through 10c are provided as the light source 10. The light sources 10a through 10c emit, at an identical light intensity, respective beams of light which differ in color (e.g., red light, blue light, and green light). The light sources 10a through 10c are provided along the side surface 20a so as to differ in angle at which light is incident on the side surface 20a of the light guide plate 20.

The light sources 10a through 10c are not particularly limited in type. For example, a light source having a directivity such as an LED (Light Emitting Diode) is suitably usable.

Note that the respective beams of light emitted by the light sources 10a through 10c are not particularly limited in color. As in Embodiment 1, the light sources 10a through 10c may emit the respective beams of light which differ in color. Alternatively, the light sources 10a through 10c may emit respective beams of light which are identical in color.

Further, the number of light sources 10 to be provided and positions of the light sources 10 are not particularly limited. For example, one light source 10 may be provided for the side surface 20a of the light guide plate 20. Alternatively, one light source 10, or two or more light sources 10 may be provided for a plurality of side surfaces of the light guide plate 20.

(Light Guide Plate 20)

The light guide plate 20 is a light guide member which guides light having entered the light guide plate 20 from the light source 10 and causes the light to exit through a light emitting region A set in the front surface (light exit surface) 20b. The light guide plate 20 is a plate-like transparent member made of a material which totally reflects light (e.g., an acrylic resin).

Light emitted from the light source 10 and having entered the light guide plate 20 through the side surface 20a of the light guide plate 20 propagates through the light guide plate 20 while being totally reflected by the front surface 20b and a back surface (counter surface) 20c of the light guide plate 20, and the light exits through the light emitting region A set in the front surface 20b of the light guide plate 20.

Note that the light guide plate 20 may have not only a shape having a flat surface but also a shape having a spherical surface or a free-form surface. According to Embodiment 1, the light guide plate 20, which has a plate-like shape, is used as the light guide body. Alternatively, the light guide plate 20 may have a shape other than the plate-like shape such as a cylindrical shape.

Figure 2:
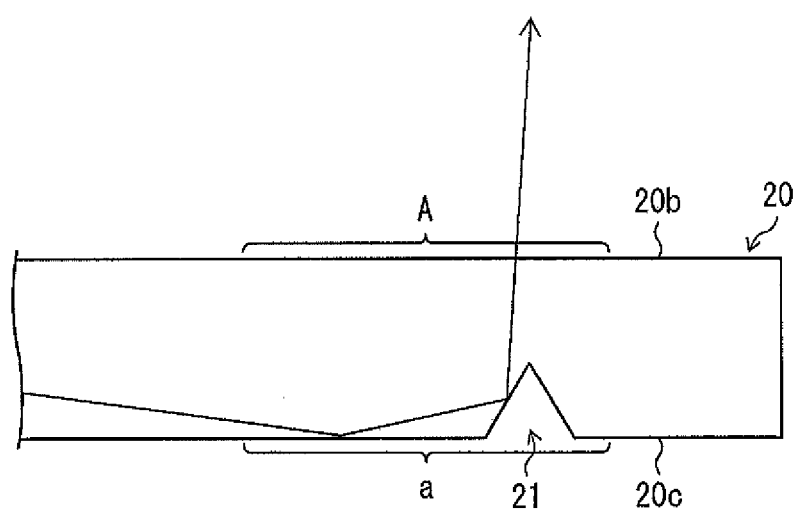
FIG. 2 is a cross-sectional view illustrating a reflection pattern provided in the light guide plate illustrated in FIGS. 1(a)-1(b).

FIG. 2 is a cross-sectional view illustrating a reflection pattern 21 provided in the light guide plate 20. As illustrated in FIG. 2, a plurality of reflection patterns 21 for regularly reflecting, toward the light emitting region A, light having entered the light guide plate 20 from the light source 10 and propagating through the light guide plate 20 are provided in a region (hereinafter referred to as a reflection region) a of the back surface 20c of the light guide plate 20, the region a corresponding to the light emitting region A (FIG. 2 illustrates only one reflection pattern 21). The reflection pattern 21 has a reflection surface which is inclined and reflects, toward the light emitting region A, the light emitted from the light source 10 and having entered the light guide plate 20 through the side surface 20a of the light guide plate 20.

According to Embodiment 1, the reflection pattern 21 is a groove which is perpendicular to the back surface 20c of the light guide plate 20, which has a cross section that is substantially isosceles triangular-shaped (V-shaped) and is parallel to a direction in which light is guided, and which is formed by notching the back surface of the light guide plate 20 so that the groove linearly extends in a direction that is perpendicular to the cross section. Note that the light guide plate 20 is a so-called see-through light guide panel made of a transparent material (described earlier). Therefore, in a case where the light source 10 is off, the reflection pattern 21 is not recognized by an observer.

Note, however, that the reflection pattern 21 is not limited to a groove-shaped pattern formed by notching the back surface 20c of the light guide plate 20. The reflection pattern 21 may be provided so as to protrude outside from the back surface 20c of the light guide plate 20. The reflection pattern 21 does not need to be provided so as to be integral with the light guide plate 20. For example, the reflection pattern 21 may be attached to the back surface of the light guide plate 20.

Figure 3:
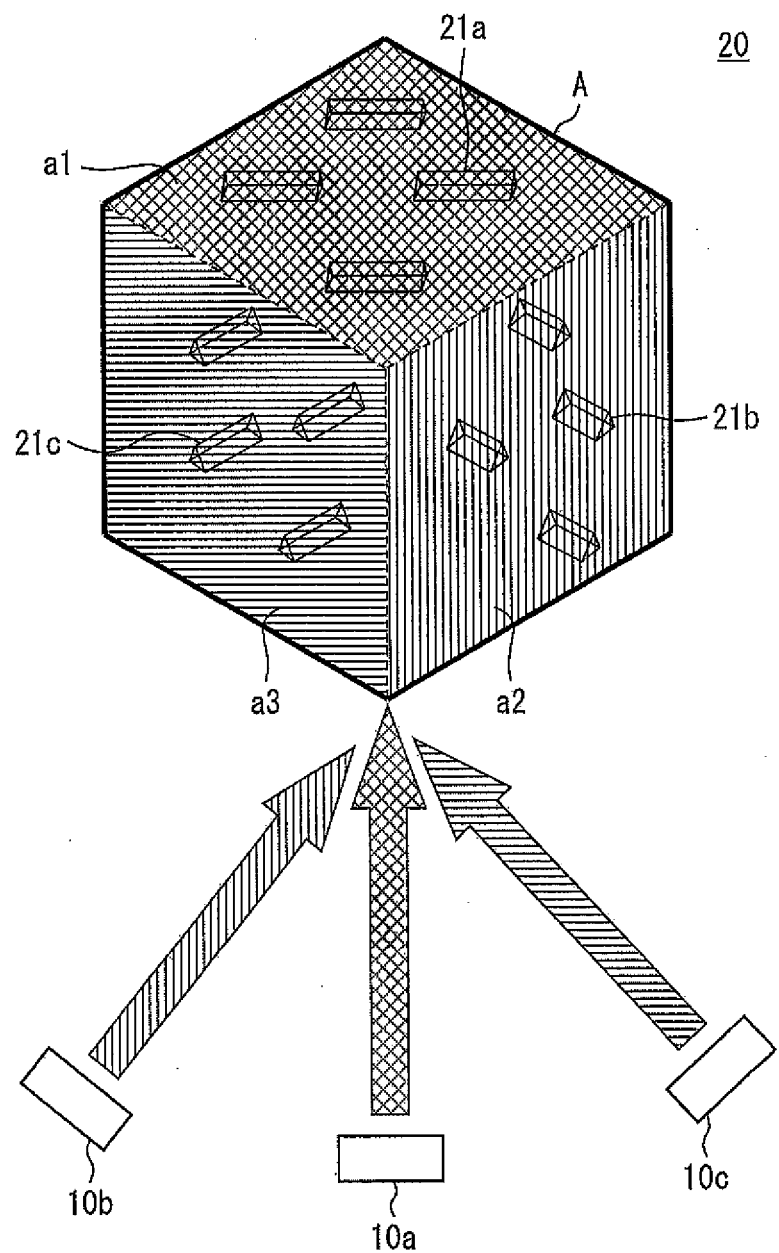
FIG. 3 is a top view illustrating a light emitting region illustrated in FIGS. 1(a)-1(b).

FIG. 3 is a top view illustrating the light emitting region A illustrated in FIGS. 1(a)-1(b). As illustrated in FIG. 3, the reflection region a which corresponds to the light emitting region A includes three regions: a first reflection region a1, a second reflection region a2, and a third reflection region (second reflection region) a3, which are in proximity to each other. The first reflection region a1, the second reflection region a2, and the third reflection region a3 correspond to respective three faces of a diagram of a cube which is displayed in the light emitting region A.

The first reflection region a1 is a rectangular region in which light from the light source 10a is reflected in a first direction. The first reflection region a1 is provided with a plurality of reflection patterns 21a whose angle of inclination of reflection surfaces and angle of arrangement are adjusted so that the light from the light source 10a is reflected in the first direction.

The second reflection region a2 is a rectangular region in which light from the light source 10b is reflected in a second direction differing from the first direction. The second reflection region a2 is provided with a plurality of reflection patterns 21b whose angle of inclination of reflection surfaces and angle of arrangement are adjusted so that the light from the light source 10b is reflected in the second direction.

The third reflection region a3 is a rectangular region in which light from the light source 10c is reflected in a third direction differing from each of the first direction and the second direction. The third reflection region a3 is provided with a plurality of reflection patterns 21c whose angle of inclination of reflection surfaces and angle of arrangement are adjusted so that the light from the light source 10c is reflected in the third direction.

Figure 4:
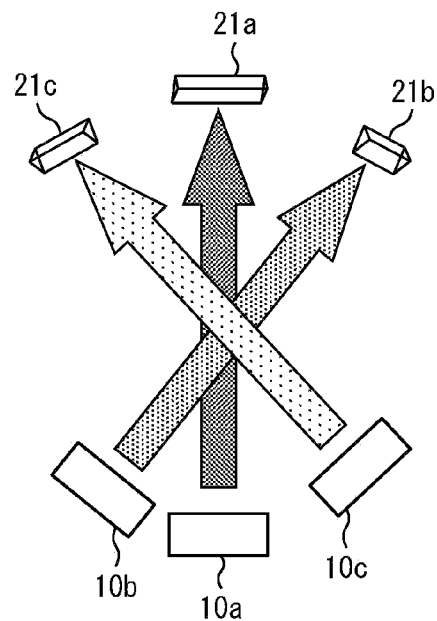
FIG. 4 is a schematic view for explaining angles of arrangement of reflection patterns illustrated in FIG. 3.

FIG. 4 is a schematic view for explaining angles of arrangement of the reflection patterns 21a through 21c illustrated in FIG. 3. As illustrated in FIG. 4, the plurality of reflection patterns 21a provided in the first reflection region a1 are arranged (aligned) at a constant density so that their reflection surfaces are substantially parallel to each other and a direction in which the plurality of reflection patterns 21a extend is perpendicular to an optical axis direction of light having entered the light guide plate 20 from the light source 10a. This allows the plurality of reflection patterns 21a to suitably reflect the light from the light source 10a in a given direction (the first direction).

The plurality of reflection patterns 21b provided in the second reflection region a2 are arranged (aligned) at a constant density so that their reflection surfaces are substantially parallel to each other and a direction in which the plurality of reflection patterns 21b extend is perpendicular to an optical axis direction of light having entered the light guide plate 20 from the light source 10b. This allows the plurality of reflection patterns 21b to suitably reflect the light from the light source 10b in a given direction (the second direction).

The plurality of reflection patterns 21c provided in the third reflection region a3 are arranged (aligned) at a constant density so that their reflection surfaces are substantially parallel to each other and a direction in which the plurality of reflection patterns 21c extend is perpendicular to an optical axis direction of light having entered the light guide plate 20 from the light source 10c. This allows the plurality of reflection patterns 21c to suitably reflect the light from the light source 10c in a given direction (the third direction).

As described earlier, the reflection region a includes the first reflection region a1, the second reflection region a2, and the third reflection region a3 in which respective beams of light are reflected in different directions. The reflection patterns 21a, the reflection patterns 21b, and the reflection patterns 21c are aligned in the first reflection region a1, the second reflection region a2, and the third reflection region a3, respectively, so that the reflection patterns 21a, the reflection patterns 21b, and the reflection patterns 21c differ in angle of arrangement in an in-plane direction of the back surface 20c of the light guide plate 20. The beam of light emitted from the light source 10a and reflected in the first reflection region a1, the beam of light emitted from the light source 10b and reflected in the second reflection region a2, and the beam of light emitted from the light source 10c and reflected in the third reflection region a3 exit through the light emitting region A while maintaining their respective directivities.

Accordingly, in accordance with an observation position of an observer who observes the front surface 20b of the light guide plate 20, the beams of light which have been reflected in the respective regions and reach the observer change in amount. This allows the light emitting region A to be visually recognized so that contrast partially occurs in the light emitting region A.

For example, in a case where the observer observes the front surface 20b of the light guide plate 20 from the first direction, a part of the light emitting region A which part corresponds the first reflection region a1 (and through which part the beam of light reflected in the first reflection region a1 exits) is visually recognized to be relatively brighter than the other regions of the light emitting region A which correspond to the second reflection region a2 and the third reflection region a3, respectively. Further, also in the other regions of the light emitting region A which correspond to the second reflection region a2 and the third reflection region a3, respectively, contrast may occur, in accordance with the observation position of the observer and setting of respective angular ranges of the second direction and the third direction, between a part of the light emitting region A which part corresponds to the second reflection region a2 and a part of the light emitting region A which part corresponds to the third reflection region a3.

Accordingly, in accordance with the observation position of the observer, the light emitting apparatus 1a can cause contrast in the three faces of the diagram of the cube, which is displayed in the light emitting region A, across a boundary line (edge line) between the respective faces. This allows the observer to stereoscopically visually recognize the cube.

Since Embodiment 1 uses the light sources 10a through 10c which emit the respective beams of light that differ in color, it is possible to display the three faces of the diagram of the cube in respective different colors. This allows a further improvement in visual effect in stereoscopic view.

Note that setting of angular ranges of directions (the first direction, the second direction, and the third direction) in which the beams of light are reflected in the first reflection region a1, the second reflection region a2, and the third reflection region a3, respectively, of the light emitting region A can be appropriately changed in accordance with, for example, an assumed observation position (a distance and an angle of the observer to the front surface 20b) and/or a type of an object to be displayed. For example, an angular distribution of the angular range of the first direction (a first angular range), the angular range of the second direction (a second angular range), and the angular range of the third direction (a third angular range) is set so that (i) ranges of reflection of light in a cross section obtained by cutting at a plane perpendicular to the front surface 20b of the light guide plate 20 do not overlap with each other and (ii) the first angular range, the second angular range, and the third angular range are continuous or are in proximity to each other.

Further, the density of the reflection patterns 21a arranged in the first reflection region a1, the density of the reflection patterns 21b arranged in the second reflection region a2, and the density of the reflection patterns 21c arranged in the third reflection region a3 may change in the first reflection region a1, the second reflection region a2, and the third reflection region a3, respectively. This allows the observer to visually recognize a bright part and a dark part in each of the parts of the light emitting region A which correspond to the first reflection region a1, the second reflection region a2, and the third reflection region a3, respectively. For example, by changing the density of the reflection patterns 21a arranged in the first reflection region a1, the part of the light emitting region A which part corresponds the first reflection region a1 can be visually recognized by the observer so as to further have a bright part and a dark part. This allows an improvement in visual effect in stereoscopic view.

Further, an object to be displayed in the front surface 20b of the light guide plate 20 is not particularly limited in, for example, shape. The object may be not only a diagram but also a text, a picture pattern, or the like. Alternatively, the object may be not only an object consisting solely of straight lines but also an object including a curved line.

A light emitting apparatus 1a of Embodiment 1 includes the light guide plate 20 which guides light entering the light guide plate 20 from the light source 10 and causes the light to exit through the light emitting region A set in the front surface 20b. The light guide plate 20 includes the plurality of reflection patterns 21 provided in the region a of the back surface 20c of the light guide plate 20, the region a corresponding to the light emitting region A. The reflection region a includes the first reflection region a1 in which the plurality of reflection patterns 21a for reflecting the light from the light source 10a in the first direction are provided, the second reflection region a2 in which the plurality of reflection patterns 21b for reflecting the light from the light source 10b in the second direction are provided, and the third reflection region a3 in which the plurality of reflection patterns 21c for reflecting the light from the light source 10c in the third direction are provided.

According to the light emitting apparatus 1a, the respective beams of light from the light sources 10a through 10c, which beams have been reflected in the first reflection region a 1, the second reflection region a2, and the third reflection region a3, respectively, exit through the light emitting region A in the first direction, the second direction, and the third direction, respectively, which differ from each other.

Therefore, for example, in a case where the observer observes the front surface 20b from the first direction, the part of the light emitting region A which part corresponds to the first reflection region a 1 is visually recognized as a bright part, and the parts of the light emitting region A which correspond to the second reflection region a2 and the third reflection region a3, respectively, are each visually recognized as a dark part.

As described earlier, according to the light emitting apparatus 1a, a direction in which light exits through the light emitting region A partially (intermittently) changes. Therefore, an amount of light which reaches the observer changes in accordance with the observation position. This allows the observer to visually recognize that the light emitting region A partially has a bright part and a dark part.

Therefore, Embodiment 1 may make it possible to provide the light guide plate 20 and the light emitting apparatus 1a each of which, by forming a bright part and a dark part in the light emitting region A and combining the bright part and the dark part, allows the observer to stereoscopically visually recognize the light emitting region A.

According to Embodiment 1, the bright part and the dark part of the light emitting region A change in position in accordance with the observation position of the observer. This makes it possible to obtain a suitable visual effect in stereoscopic view.

Further, while maintaining light emitted from the respective plurality of light sources 10a through 10c at a constant intensity, Embodiment 1 allows the observer to visually recognize that the light emitting region A partially has a bright part and a dark part.

Modified Examples

Modified Example 1

Figure 5:
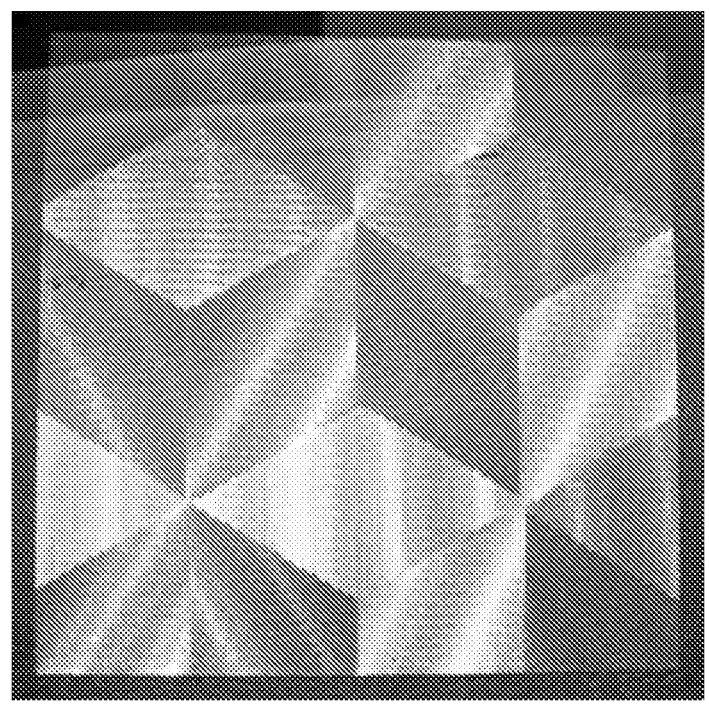
FIG. 5 is an explanatory drawing showing a modified example of a light emitting state of the light guide plate of Embodiment 1.
Figure 6:
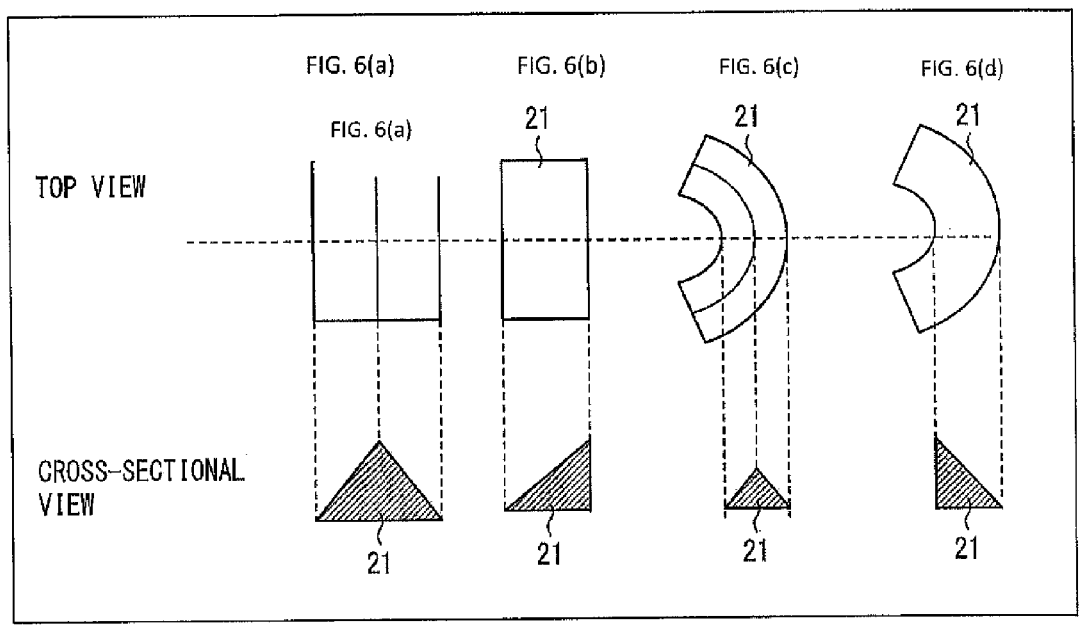
FIGS. 6(a)-6(d) are cross-sectional views each showing a modified example of the reflection pattern.

FIG. 5 is an explanatory drawing showing a modified example of a light emitting state of the light guide plate 20 of Embodiment 1. Embodiment 1 has discussed a configuration in which one light emitting region A having a bright part and a dark part is set in the front surface 20b of the light guide plate 20. Note, however, that the present invention is not limited to such a configuration. For example, it is also possible to set a plurality of light emitting regions A in the front surface 20b of the light guide plate 20.

For example, as illustrated in FIG. 5, it is possible to set, in the front surface 20b of the light guide plate 20, light emitting regions A which are large in number and are provided so as to be adjacent to each other in a matrix pattern. This allows the observer to stereoscopically visually recognize an object which is formed by combining the light emitting regions A each having a bright part and a dark part.

In a case where the plurality of light emitting regions A are thus set in the front surface 20b of the light guide plate 20 and combined, an object such as a complicated diagram, text, or picture pattern can be stereoscopically displayed.

Modified Example 2

FIGS. 6(a)-6(d) are cross-sectional views each showing a modified example of the reflection pattern 21. An upper part of each of FIGS. 6(a)-6(d) is a top view of the reflection pattern 21, and a lower part of each of FIGS. 6(a)-6(d) is a cross-sectional view of the reflection pattern 21.

According to Embodiment 1 described earlier, as illustrated in FIG. 6(a), the reflection pattern 21 has a cross section that has a substantially isosceles triangular shape having two inclined surfaces. Note, however, that a cross-sectional shape and a pattern shape of the reflection pattern can be appropriately changed in accordance with, for example, position(s) at which the light source(s) 10 is/are provided, the number of the light source(s) 10, a type of the object to be displayed, and/or a direction in which light is reflected.

For example, as illustrated in FIG. 6(b), it is possible to form, as the reflection pattern 21, a groove which has a cross section that has a substantially right triangular shape having one inclined surface. In this case, the reflection pattern 21 is formed so that the inclined surface is located in a direction in which light enters the light guide plate 20.

Further, as illustrated in FIG. 6(c)-6(d), the reflection pattern 21 may have a curved pattern shape instead of a linear pattern shape.

Modified Example 3

Figure 7:
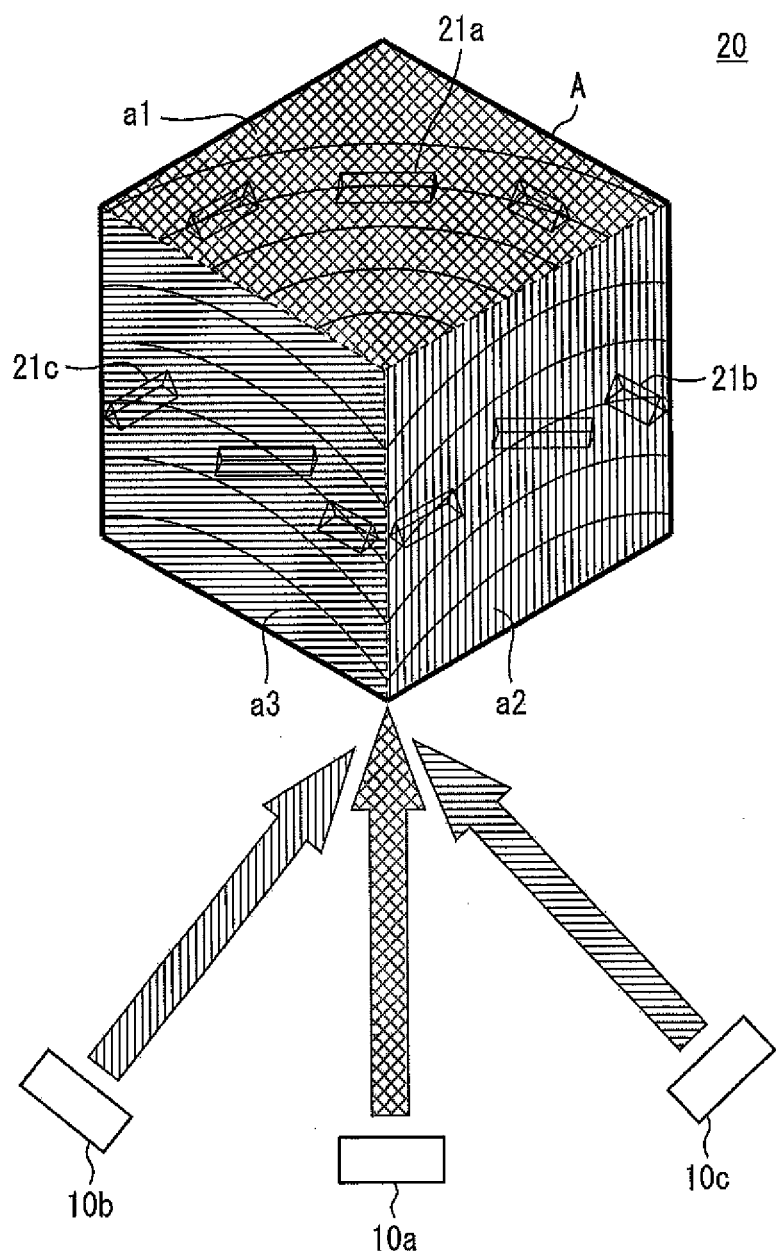
FIG. 7 is a perspective view showing an example of how the reflection patterns are arranged in a reflection region illustrated in FIG. 3.

FIG. 7 is a perspective view showing an example of how the reflection patterns 21 are arranged in the reflection region a. Embodiment 1 has discussed a configuration in which the reflection patterns 21a, the reflection patterns 21b, and the reflection patterns 21c are aligned in the first reflection region a1, the second reflection region a2, and the third reflection region a3, respectively, as illustrated in FIG. 3. Note, however, that the present invention is not limited to such a configuration.

For example, the reflection patterns 21a provided in the first reflection region a1 may be configured such that an angle formed by (i) a straight line connecting the light source 10a and a center of a corresponding reflection pattern 21a (a center of a direction in which a reflection surface of that reflection pattern 21a extends when the reflection pattern 21a is seen from a direction perpendicular to the back surface 20c of the light guide plate 20) and (ii) the reflection surface of the reflection pattern 21a may be changed in accordance with a position of the reflection pattern 21a in the first reflection region a1 (see FIG. 7). The reflection patterns 21b provided in the second reflection region a2 may be configured such that an angle formed by (i) a straight line connecting the light source 10b and a center of a corresponding reflection pattern 21b (a center of a direction in which a reflection surface of that reflection pattern 21b extends when the reflection pattern 21b is seen from the direction perpendicular to the back surface 20c of the light guide plate 20) and (ii) the reflection surface of the reflection pattern 21b may be changed in accordance with a position of the reflection pattern 21b in the second reflection region a2 (see FIG. 7). The reflection patterns 21c provided in the third reflection region a3 may be configured such that an angle formed by (i) a straight line connecting the light source 10c and a center of a corresponding reflection pattern 21c (a center of a direction in which a reflection surface of that reflection pattern 21c extends when the reflection pattern 21c is seen from the direction perpendicular to the back surface 20c of the light guide plate 20) and (ii) the reflection surface of the reflection pattern 21c may be changed in accordance with a position of the reflection pattern 21c in the third reflection region a3 (see FIG. 7).

As described earlier, by changing the above angles of the reflection pattern 21a, the reflection pattern 21b, and the reflection pattern 21c, which are provided in the first reflection region a1, the second reflection region a2, and the third reflection region a3, respectively, it is possible to more accurately control an angular range of the light reflected in each of the first reflection region a1, the second reflection region a2, and the third reflection region a3.

Modified Example 4

Figure 8:
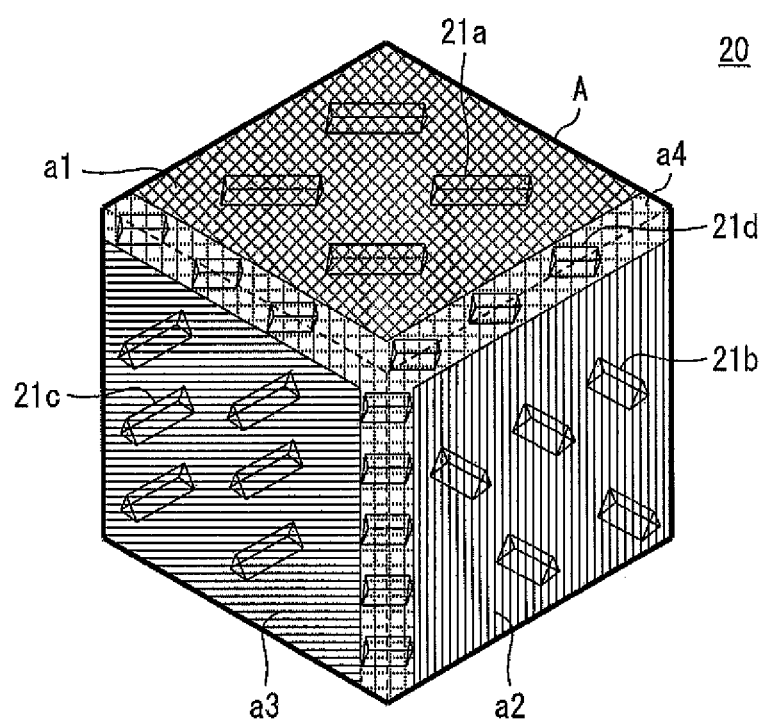
FIG. 8 is a perspective view showing another example of how the reflection patterns are arranged in the reflection region.
Figure 9:
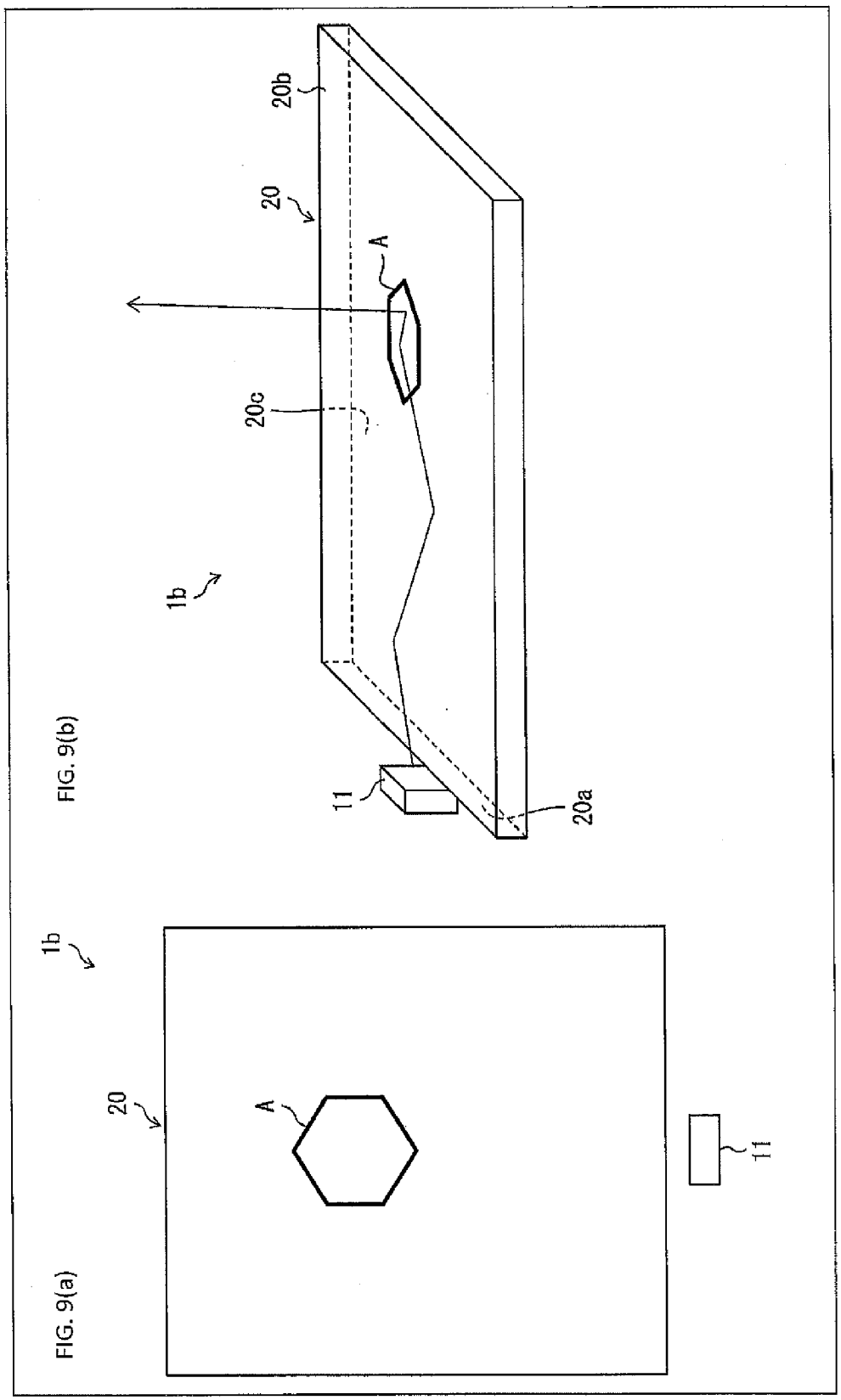
FIGS. 9(a)-9(b) are explanatory drawings schematically illustrating a configuration of a light emitting apparatus including a light guide plate of Embodiment 2.

FIG. 8 is a perspective view showing another example of how the reflection patterns 21 are arranged in the reflection region a. Embodiment 1 has discussed a configuration in which the reflection region a includes the three regions: the first reflection region a1, the second reflection region a2, and the third reflection region a3. Note, however, that the present invention is not limited to such a configuration. The reflection region a may include another region other than the first reflection region a1, the second reflection region a2, and the third reflection region a3.

For example, as illustrated in FIG. 8, the reflection region a may further include, in a region which defines a boundary between the first reflection region a1 and the second reflection region a2, between the first reflection region a1 and the third reflection region a3, and between the second reflection region a2 and the third reflection region a3, a linear reflection region (second light emitting region) a4 in which reflection patterns 21d are linearly provided.

The linear reflection region a4 is a linear region in which light is reflected in a fourth direction differing from each of the first direction, the second direction, and the third direction. The linear reflection region a4 is provided with the reflection patterns 21d whose angle of inclination of reflection surfaces and angle of arrangement are adjusted so that the light is reflected in the fourth direction. According to Modified Example 4, the linear reflection region a4 causes reflection of light from a light source (not illustrated) which is provided so as to correspond to the linear reflection region a4 and emits light whose color (e.g., yellow) differs from that of each of the light sources 10a through 10c.

This allows a boundary part among the three faces of the diagram of the cube, which is displayed in the light emitting region A, to emit light in a color differing from each of the colors in which the respective three faces emit light, so that contrast can occur in the three faces across the boundary part.

Therefore, Modified Example 4 may make it possible to add a greater visual effect in stereoscopic view of the light emitting apparatus 1a.

Embodiment 2

Additional embodiments of the present invention are described below with reference to FIG. 9(a) through 11. Note that for convenience, members having functions similar to those of the respective members of Embodiment 1 are given respective identical reference numerals, and a description of those members is omitted here.

<Configuration of Light Emitting Apparatus 1b>

FIGS. 9(a)-9(b) are explanatory drawings schematically illustrating a configuration of a light emitting apparatus 1b including a light guide plate 20 of Embodiment 2. FIG. 9(a) is a top view of the light emitting apparatus 1b, and FIG. 9(b) is a perspective view of the light emitting apparatus 1b. The light emitting apparatus 1b of Embodiment 2 differs from the light emitting apparatus 1a of Embodiment 1 (described earlier) mainly in that the light emitting apparatus 1b of Embodiment 2 includes one light source 11 instead of the three light sources 10a through 10c.

The light emitting apparatus 1b includes the light source 11 and the light guide plate 20 (see FIGS. 9(a)-9(b)).

(Light Source 11)

The light source 11 is a light emitting device which emits light toward a side surface 20a of the light guide plate 20. According to Embodiment 2, one light source 11 is provided so as to face the side surface 20a of the light guide plate 20. The light source 11 is not particularly limited in type. For example, an LED or the like is usable as the light source 11.

Light emitted from the light source 11 enters the light guide plate 20 through the side surface 20a and propagates through the light guide plate 20 while being totally reflected by a front surface 20b and a back surface 20c of the light guide plate 20, and the light exits through a light emitting region A, which is a given region of the front surface 20b of the light guide plate 20.

Figure 10:
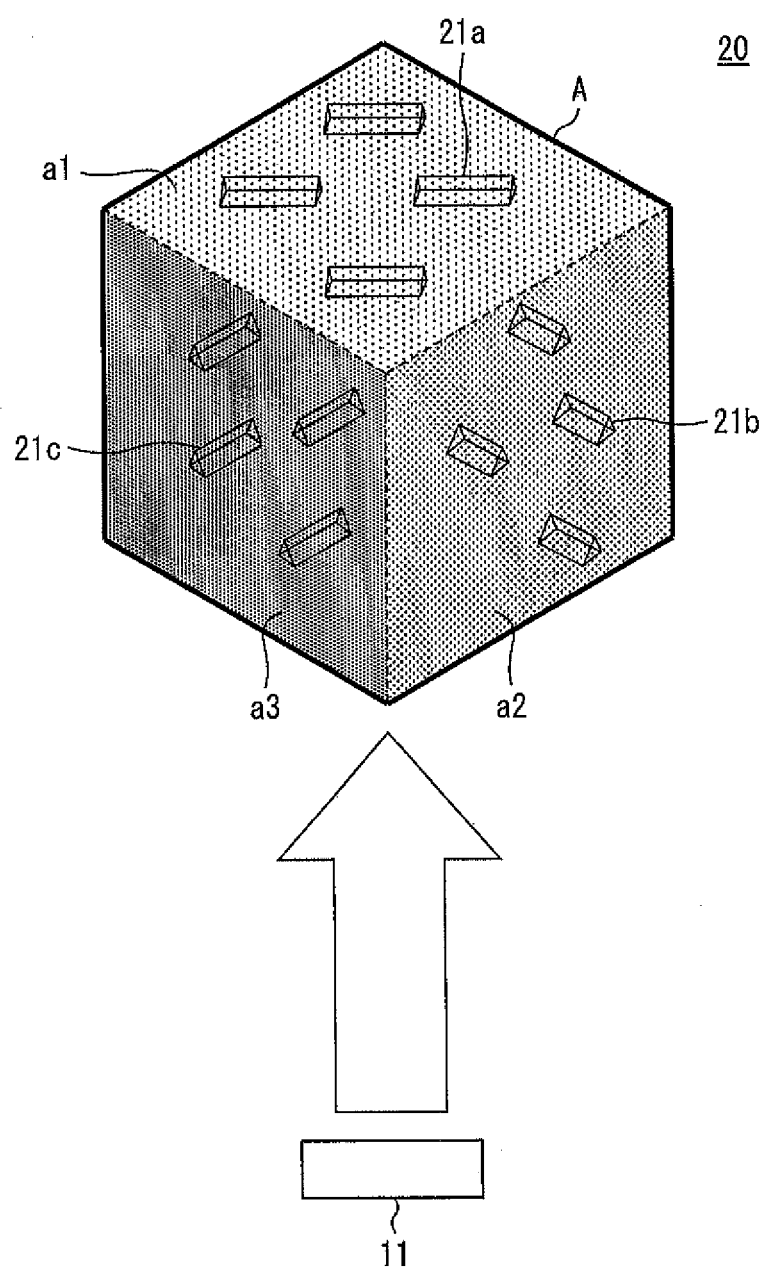
FIG. 10 is a top view illustrating a light emitting region illustrated in FIGS. 9(a)-9(b).

FIG. 10 is a top view illustrating the light emitting region A illustrated in FIGS. 9(a)-9(b). As illustrated in FIG. 10, the reflection region a which corresponds to the light emitting region A includes three regions: a first reflection region a1, a second reflection region a2, and a third reflection region a3. The first reflection region a1, the second reflection region a2, and the third reflection region a3 correspond to respective three faces of a diagram of a cube which is displayed in the light emitting region A.

The first reflection region a1 is a rectangular region in which light from the light source 11 is reflected in a first direction. The first reflection region a1 is provided with a plurality of reflection patterns 21a whose angle of inclination of reflection surfaces and angle of arrangement are adjusted so that the light from the light source 11 is reflected in the first direction.

The second reflection region a2 is a rectangular region in which light from the light source 11 is reflected in a second direction differing from the first direction. The second reflection region a2 is provided with a plurality of reflection patterns 21b whose angle of inclination of reflection surfaces and angle of arrangement are adjusted so that the light from the light source 11 is reflected in the second direction.

The third reflection region a3 is a rectangular region in which light from the light source 11 is reflected in a third direction differing from each of the first direction and the second direction. The third reflection region a3 is provided with a plurality of reflection patterns 21c whose angle of inclination of reflection surfaces and angle of arrangement are adjusted so that the light from the light source 11 is reflected in the third direction.

Figure 11:
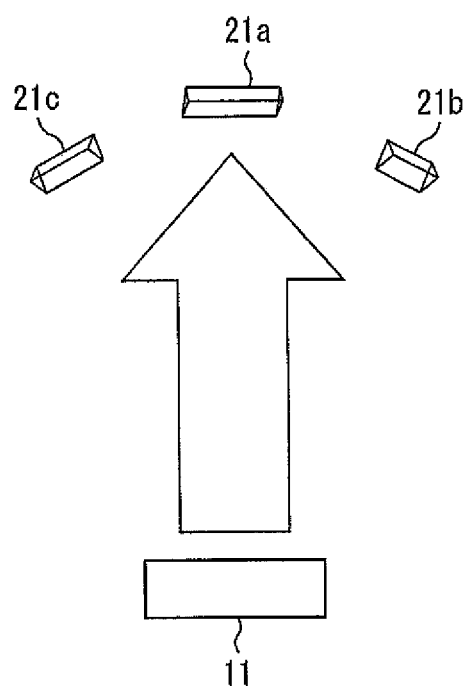
FIG. 11 is a schematic view for explaining angles of arrangement of reflection patterns illustrated in FIG. 10.

FIG. 11 is a schematic view for explaining angles of arrangement of the reflection patterns 21a through 21c illustrated in FIG. 10. As illustrated in FIG. 11, the plurality of reflection patterns 21a provided in the first reflection region a 1 are arranged so that their reflection surfaces are substantially parallel to each other and a direction in which the plurality of reflection patterns 21a extend is perpendicular to an optical axis direction of light having entered the light guide plate 20 from the light source 11. This allows the plurality of reflection patterns 21a to suitably reflect the light from the light source 11 in a given direction (the first direction).

The plurality of reflection patterns 21b provided in the second reflection region a2 are arranged so that their reflection surfaces are substantially parallel to each other and a direction in which the plurality of reflection patterns 21b extend is at a given angle with respect to an optical axis direction of light having entered the light guide plate 20 from the light source 11. This allows the plurality of reflection patterns 21b to suitably reflect the light from the light source 11 in a given direction (the second direction).

The plurality of reflection patterns 21c provided in the third reflection region a3 are arranged so that their reflection surfaces are substantially parallel to each other and a direction in which the plurality of reflection patterns 21c extend is at a given angle with respect to an optical axis direction of light having entered the light guide plate 20 from the light source 11. This allows the plurality of reflection patterns 21c to suitably reflect the light from the light source 11 in a given direction (the third direction).

As described earlier, the reflection region a includes the first reflection region a1, the second reflection region a2, and the third reflection region a3 in which respective beams of light are reflected in different directions. The beam of light emitted from the light source 11 and reflected in the first reflection region a1, the beam of light emitted from the light source 11 and reflected in the second reflection region a2, and the beam of light emitted from the light source 11 and reflected in the third reflection region a3 exit through the light emitting region A while maintaining their respective directivities.

Accordingly, in accordance with an observation position of an observer, the light emitting apparatus 1b can cause contrast in the three faces of the diagram of the cube, which is displayed in the light emitting region A. This allows the observer to stereoscopically visually recognize the cube.

A light emitting apparatus 1b of Embodiment 2 includes the light guide plate 20 which guides light entering the light guide plate 20 from the light source 11 and causes the light to exit through the light emitting region A set in the front surface 20b. The light guide plate 20 includes the plurality of reflection patterns 21 provided in the region a of the back surface 20c of the light guide plate 20, the region a corresponding to the light emitting region A. The reflection region a includes the first reflection region a1 in which the plurality of reflection patterns 21a for reflecting the light from the light source 11 in the first direction are provided, the second reflection region a2 in which the plurality of reflection patterns 21b for reflecting the light from the light source 11 in the second direction are provided, and the third reflection region a3 in which the plurality of reflection patterns 21c for reflecting the light from the light source 11 in the third direction are provided.

According to the light emitting apparatus 1b, the beams of light from the light source 11, which have been reflected in the first reflection region a1, the second reflection region a2, and the third reflection region a3, respectively, exit through the light emitting region A in the first direction, the second direction, and the third direction, respectively, which differ from each other.

Therefore, according to the light emitting apparatus 1b, a direction in which light exits through the light emitting region A partially (intermittently) changes. Therefore, an amount of light which reaches the observer changes in accordance with the observation position. This allows the observer to visually recognize that the light emitting region A partially has a bright part and a dark part.

Therefore, according to Embodiment 2, use of one light source 11 allows the observer to stereoscopically visually recognize the light emitting region A. This makes it possible to provide the light emitting apparatus 1b at low cost.

<Supplementary Remarks>

A light guide body according to one or more embodiments of the present invention may be configured such that reflection surfaces of reflection patterns which are included in the plurality of reflection patterns and which are arranged in the first reflection region are substantially parallel to each other, and reflection surfaces of reflection patterns which are included in the plurality of reflection patterns and which are arranged in the second reflection region are substantially parallel to each other.

According to the configuration, since the reflection surfaces of the reflection patterns which are arranged in the first reflection region are substantially parallel to each other, the light from the light source can be reflected in the first direction by these reflection patterns. Meanwhile, since the reflection surfaces of the reflection patterns which are arranged in the second reflection region are substantially parallel to each other, the light from the light source can be reflected in the second direction by these reflection patterns.

Therefore, according to the configuration, light can be suitably reflected in respective given directions in the first reflection region and the second reflection region.

A light guide body according to one or more embodiments of the present invention may be configured such that the reflection patterns which are arranged in the first reflection region and the reflection patterns which are arranged in the second reflection region differ in angle of the reflection surfaces in an in-plane direction of the counter surface.

According to the configuration, the reflection patterns which are arranged in the first reflection region and the reflection patterns which are arranged in the second reflection region differ in angle (direction) of the reflection surfaces in the in-plane direction of the counter surface, i.e., differ in direction of the reflection surfaces when the reflection patterns are seen from a direction perpendicular to the counter surface. Therefore, the light from the light source can be suitably reflected in respective directions differing between the first reflection region and the second reflection region.

A light guide body according to one or more embodiments of the present invention may be configured such that the reflection patterns arranged in at least one of the first reflection region and the second reflection region change in density of arrangement.

The configuration allows the observer to visually recognize that the part of the at least one light emitting region which part corresponds to the first reflection region or the part of the at least one light emitting region which part corresponds to the second reflection region has a bright part and a dark part. For example, by changing the density of the reflection patterns arranged in the first reflection region, the part of the at least one light emitting region which part corresponds the first reflection region can be visually recognized by the observer so as to have a bright part and a dark part.

Therefore, the configuration allows an improvement in visual effect in stereoscopic view.

A light guide body according to one or more embodiments of the present invention may be configured such that beams of light from different light sources which are separately provided so as to correspond to the first reflection region and the second reflection region, respectively, are reflected in the first reflection region and the second reflection region, respectively.

According to the configuration, the beams of light from the different light sources are reflected in the first reflection region and the second reflection region, respectively. Therefore, an angle of inclination of the reflection surfaces of the reflection patterns arranged in each of the first reflection region and the second reflection region and an angle of arrangement of the reflection patterns (i.e., a direction of the reflection patterns when the reflection patterns are seen from a direction perpendicular to the counter surface) are adjusted so that light from a corresponding one of the light sources is reflected in a given direction.

Therefore, the configuration makes it easy to adjust the angle of inclination of the reflection surfaces of the reflection patterns arranged in each of the first reflection region and the second reflection region and the angle of arrangement of the reflection patterns. This allows a higher degree of freedom in design.

According to the configuration, by, for example, using light sources which emit respective beams of light that differ in color, it is possible to form, in the at least one light emitting region, a bright part and a dark part which differ in color. This allows a further improvement in visual effect in stereoscopic view.

A light guide body according to one or more embodiments of the present invention may be configured such that the light guide body is made of a transparent material.

According to the configuration, the light guide body is made of a transparent material. This makes it possible to obtain a so-called see-through light guide body.

A light guide body according to one or more embodiments of the present invention may be configured such that a ratio of a projected area of the plurality of reflection patterns to a projected area of the entire light exit surface is not more than 15% when the plurality of reflection patterns are seen from a direction perpendicular to the light exit surface. Alternatively, a light guide body according to one or more embodiments of the present invention may be configured such that the ratio is not more than 8%.

The configuration can prevent the observer from recognizing the plurality of reflection patterns in a state in which the light sources are off.

The light guide body according to one or more embodiments of the present invention may be configured such that the at least one light emitting region set in the light exit surface comprises a plurality of light emitting regions.

According to the configuration, in a case where a plurality of light emitting regions each having a bright part and a dark part are combined, an object such as a more complicated diagram, text, or picture pattern can be stereoscopically displayed.

A light emitting apparatus according to one or more embodiments of the present invention includes: at least one light source; and a light guide body which guides light having entered the light guide body from the at least one light source and causes the light to exit through a light emitting region set in a light exit surface of the light guide body.

The configuration may make it possible to provide the light emitting apparatus which, by forming a bright part and a dark part in the light emitting region and combining the bright part and the dark part, allows the observer to stereoscopically visually recognize the light emitting region.

The light emitting apparatus according to one or more embodiments of the present invention may be configured such that: the at least one light source comprises a plurality of light sources; and the plurality of light sources are arranged at intervals of not less than 5 mm with respect to a light entrance surface, the light entrance surface being a surface of the light guide body through which surface light from the respective plurality of light sources enters the light guide body.

According to the configuration, point light sources are suitably usable as the plurality of light sources.

An amusement machine according to one or more embodiments of the present invention includes a light emitting apparatus mentioned above.

The configuration may make it possible to provide the amusement machine which, by forming a bright part and a dark part in the light emitting region and combining the bright part and the dark part, allows the observer to stereoscopically visually recognize the light emitting region.

The present invention is not limited to the embodiments above, but may be altered by a skilled person within the scope of the claims. That is, an embodiment based on a proper combination of technical means altered within the scope of the claims is encompassed in the technical scope of the present invention.

One or more embodiments of the present invention is applicable to a light guide body which guides light having entered the light guide body from a light source and causes the light to exit through a light exit surface of the light guide body, and to a light emitting apparatus including the light guide body. For example, one or more embodiments of the present invention may be suitably provided in an amusement machine such as a pachinko machine or a slot machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1*a*, 1*b* Light emitting apparatus
10 Light source 10a-10c Light source
11 Light source
20 Light guide plate (light guide body)
20a Side surface
20b Front surface (light exit surface)
20c Back surface (counter surface)
21 Reflection pattern
21a-21c Reflection pattern
a Light emitting region
A Reflection region
a1 First reflection region
a2 Second reflection region
a3 Third reflection region (second reflection region)
a4 Linear reflection region (second reflection region)

The invention claimed is:

1. A light guide body configured to guide light from a light source that enters the light guide body, comprising:
 a light exit surface having at least one light emitting region from which light from the light source is emitted; and
 a plurality of reflection patterns arranged in a reflection region of a counter surface facing the light exit surface,
 wherein the reflection region is a region corresponding to the at least one light emitting region,
 wherein the reflection region comprises at least a first reflection region that reflects light in a first direction, and a second reflection region that reflects light in a second direction differing from the first direction,
 wherein the first reflection region and the second reflection region are in proximity to each other,
 wherein the light guide body displays, on the light exit surface, an object that is in accordance with an arrangement of the plurality of reflection patterns,
 wherein the first reflection region and the second reflection region are structured to combine at least (i) the light reflected in the first direction by first reflection patterns, arranged in the first reflection region, of the plurality of reflection patterns and (ii) the light reflected in the second direction by second reflection patterns, arranged in the second reflection region, of the plurality of reflection patterns to form the object stereoscopically, such that the light guide body causes an observer to stereoscopically visually recognize the object, and
 wherein the light reflected in the first direction forms a first part of the object and the light reflected in the second direction forms a second part of the object.

2. The light guide body as set forth in claim 1,
 wherein reflection surfaces of reflection patterns which are included in the plurality of reflection patterns and which are arranged in the first reflection region are substantially parallel to each other, and
 wherein reflection surfaces of reflection patterns which are included in the plurality of reflection patterns and which are arranged in the second reflection region are substantially parallel to each other.

3. The light guide body as set forth in claim 2, wherein the reflection patterns which are arranged in the first reflection region and the reflection patterns which are arranged in the second reflection region differ in angle of the reflection surfaces in an in-plane direction of the counter surface.

4. The light guide body as set forth in claim 1, wherein the reflection patterns arranged in at least one of the first reflection region and the second reflection region change in density of arrangement.

5. The light guide body as set forth in claim 1, wherein beams of light from different light sources which are separately provided so as to correspond to the first reflection region and the second reflection region, respectively, are reflected in the first reflection region and the second reflection region, respectively.

6. The light guide body as set forth in claim 1, wherein the light guide body is made of a transparent material.

7. The light guide body as set forth in claim 1, wherein a ratio of a projected area of the plurality of reflection patterns to a projected area of the entire light exit surface is not more than 15% when the plurality of reflection patterns are seen from a direction perpendicular to the light exit surface.

8. The light guide body as set forth in claim 7, wherein the ratio is not more than 8%.

9. The light guide body as set forth in claim 1, wherein the at least one light emitting region set in the light exit surface comprises a plurality of light emitting regions.

10. A light emitting apparatus comprising:
 at least one light source; and
 a light guide body that guides light from the at least one light source that enters the light guide body, comprising:
 a light exit surface having a light emitting region from which light from the at least one light source is emitted; and
 a plurality of reflection patterns arranged in a reflection region of a counter surface facing the light exit surface,
 wherein the reflection region is a region corresponding to the light emitting region,
 wherein the reflection region includes at least a first reflection region in which the light is reflected in a first direction, and a second reflection region in which the light is reflected in a second direction differing from the first direction,
 wherein the first reflection region and the second reflection region are in proximity to each other,
 wherein the light guide body displays, on the light exit surface, an object that is in accordance with an arrangement of the plurality of reflection patterns,
 wherein the first reflection region and the second reflection region are structured to combine at least (i) the light reflected in the first direction by first reflection patterns, arranged in the first reflection region, of the plurality of reflection patterns and (ii) the light reflected in the second direction by second reflection patterns, arranged in the second reflection region, of the plurality of reflection patterns to form the object stereoscopically, such that the light guide body causes an observer to stereoscopically visually recognize the object, and
 wherein the light reflected in the first direction forms a first part of the object and the light reflected in the second direction forms a second part of the object.

11. The light emitting apparatus as set forth in claim 10,
 wherein the at least one light source comprises a plurality of light sources,
 wherein the plurality of light sources are arranged at intervals of not less than 5 mm with respect to a light entrance surface, and
 wherein the light entrance surface is a surface of the light guide body through which surface light from the respective plurality of light sources enters the light guide body.

12. An amusement machine comprising:
 a light emitting apparatus, comprising:
 a light source; and
 a light guide body that guides light from the light source that enters the light guide body, comprising:
 a light exit surface having a light emitting region from which light from the light source is emitted, and a plurality of reflection patterns arranged in a reflection region of a counter surface facing the light exit surface, wherein the reflection region is a region corresponding to the light emitting region, wherein the reflection region comprises at least a first reflection region in which the light is reflected in a first direction and a second reflection region in which the light is reflected in a second direction differing from the first direction, wherein the first reflection region and the second reflection region are in proximity to each other, wherein the light guide body displays, on the light exit surface, an object that is in accordance with an arrangement of the plurality of reflection patterns, wherein the first reflection region and the second reflection region are structured to combine at least (i) the light reflected in the first direction by first reflection patterns, arranged in the first reflection region, of the plurality of reflection patterns and (ii) the light reflected in the second direction by second reflection patterns, arranged in the second reflection region, of the plurality of reflection patterns to form the object stereoscopically, such that the light guide body causes an observer to stereoscopically visually recognize the object, and wherein the light reflected in the first direction forms a first part of the object and the light reflected in the second direction forms a second part of the object.

* * * * *